US008698950B2

(12) United States Patent
Kim et al.

(10) Patent No.: US 8,698,950 B2
(45) Date of Patent: Apr. 15, 2014

(54) DEVICE AND METHOD FOR CONTROLLING A CAMERA MODULE IN A MOBILE TERMINAL TO REDUCE POWER CONSUMPTION

(75) Inventors: Jin-Man Kim, Gumi-si (KR); Jun-Hui Lee, Gumi-si (KR); Yun-Mi Heo, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1411 days.

(21) Appl. No.: 11/765,208

(22) Filed: Jun. 19, 2007

(65) Prior Publication Data

US 2008/0117314 A1    May 22, 2008

(30) Foreign Application Priority Data

Nov. 21, 2006  (KR) .................. 10-2006-0115092

(51) Int. Cl.
*H04N 5/225*    (2006.01)
(52) U.S. Cl.
USPC ..................... 348/372; 348/207.11
(58) Field of Classification Search
None
See application file for complete search history.

(56) References Cited

U.S. PATENT DOCUMENTS

| 6,005,613 | A | * | 12/1999 | Endsley et al. | ............ 348/231.6 |
| 6,130,420 | A | * | 10/2000 | Tanaka et al. | ............ 250/208.1 |
| 2004/0151242 | A1 | | 8/2004 | Chang | |

FOREIGN PATENT DOCUMENTS

| EP | 0 932 304 A2 | 7/1999 |
| JP | 2001-238190 A | 8/2001 |
| JP | 2006-245798 A | 9/2006 |
| KR | 10-2007-0049439 A | 5/2007 |

* cited by examiner

*Primary Examiner* — Justin P Misleh
(74) *Attorney, Agent, or Firm* — Jefferson IP Law, LLP

(57) ABSTRACT

A camera control device and a method for operating a mobile terminal having a single camera module in selected modes to reduce the power consumption of the mobile terminal is disclosed. The camera control device for a mobile terminal includes a camera module, a memory, and a control unit. The camera module has a sensor for photographing an image. The memory stores tables which are provided for respective modes of the camera module and which include camera register values set for each mode and stores initial values of the sensor for the respective modes to initialize the sensor of the camera module. The control unit determines a mode of operating the camera module, extracts camera register values for the mode from a corresponding table stored in the memory, and operates the camera module according to the extracted camera register values to implement the corresponding mode.

21 Claims, 2 Drawing Sheets

DEVICE AND METHOD FOR CONTROLLING A CAMERA MODULE IN A MOBILE TERMINAL TO REDUCE POWER CONSUMPTION

PRIORITY

This application claims the benefit under 35 U.S.C. §119(a) of a Korean patent application filed in the Korean Intellectual Property Office on Nov. 21, 2006 and assigned Serial No. 2006-115092, the entire disclosure of which is hereby incorporated by reference.

BACKGROUND OF THE INVENTION

1. Field of the Invention

The present invention relates to a device and a method for controlling a camera module in a mobile terminal. More particularly, the present invention relates to a device and a method for operating a mobile terminal having a single camera module in different camera modes to reduce the power consumption of the mobile terminal.

2. Description of the Related Art

A third generation (3G) mobile phone having two cameras uses a high resolution (2 megapixel) camera in a general camera mode or a VGA camera in a video conference mode. These cameras operate at different pixel clock frequencies according to the selected mode.

The video conference mode increases the power consumption of the mobile terminal. Consequently, the VGA camera is operated at a lower pixel clock frequency to reduce the power consumption.

A mobile terminal having a single camera, however, uses the same camera sensor in both modes and applies the same pixel clock frequency both in the general camera mode for taking a photograph or a motion picture and in the video conference mode.

In a folder-type mobile terminal having a single high-resolution swivel camera, the camera is used in the video conference mode in the same manner as it is used in the general motion picture mode. When compared to a 3G mobile terminal using a separate VGA camera in the video conference mode, a mobile terminal using a single high-resolution camera performs additional operations for resizing an image obtained by the camera sensor to reduce the size of the image due to the high pixel clock frequency and limitations in the data transmission rate and the amount of data to be transmitted. Therefore, the power consumption in this type of terminal is relatively high, which also results in the increase of the duty cycle of a multimedia device.

SUMMARY OF THE INVENTION

An aspect of the present invention is to address at least the above-mentioned problems and/or disadvantages and to provide at least the advantages described below. Accordingly, an aspect of the present invention is to provide a device and method for operating a mobile terminal having a single camera module by controlling the operation of the camera module to reduce the power consumption of the mobile terminal.

In accordance with an aspect of the present invention, a camera control device for a mobile terminal is provided. The camera control device includes a camera module, a memory, and a control unit. The camera module has a sensor for photographing an image. The memory stores tables of camera register values for respective modes of the camera module. The control unit determines a mode of operating the camera module, extracts camera register values for the mode from a corresponding table stored in the memory, and operates the camera module according to the extracted camera register values to implement the corresponding mode.

In accordance with another aspect of the present invention, a method for controlling a camera module in a mobile terminal is provided. The method includes the steps of determining a mode of operating the camera module, extracting camera register values for the mode from a corresponding table stored in a memory, and operating the camera module according to the extracted camera register values to implement the corresponding mode.

In accordance with still another aspect of the present invention, a method for controlling a camera module in a mobile terminal is provided. The method includes the steps of, when a camera mode is selected, operating the camera module according to a pixel clock frequency and a picture size for the camera mode, which are extracted from a camera mode table, to implement the camera mode, and, when a video conference mode is selected, operating the camera module according to a pixel clock frequency and a picture size for the video conference mode, which are extracted from a video conference mode table, to implement the video conference mode.

In accordance with still another aspect of the present invention, a method for controlling a camera module in a mobile terminal is provided. The method includes the steps of, when a camera mode is selected, operating the camera module according to a default pixel clock frequency and a default picture size to implement the camera mode, and, when a video conference mode is selected, operating the camera module according to a pixel clock frequency and a picture size for the video conference mode, which are extracted from a video conference mode table, to implement the video conference mode.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
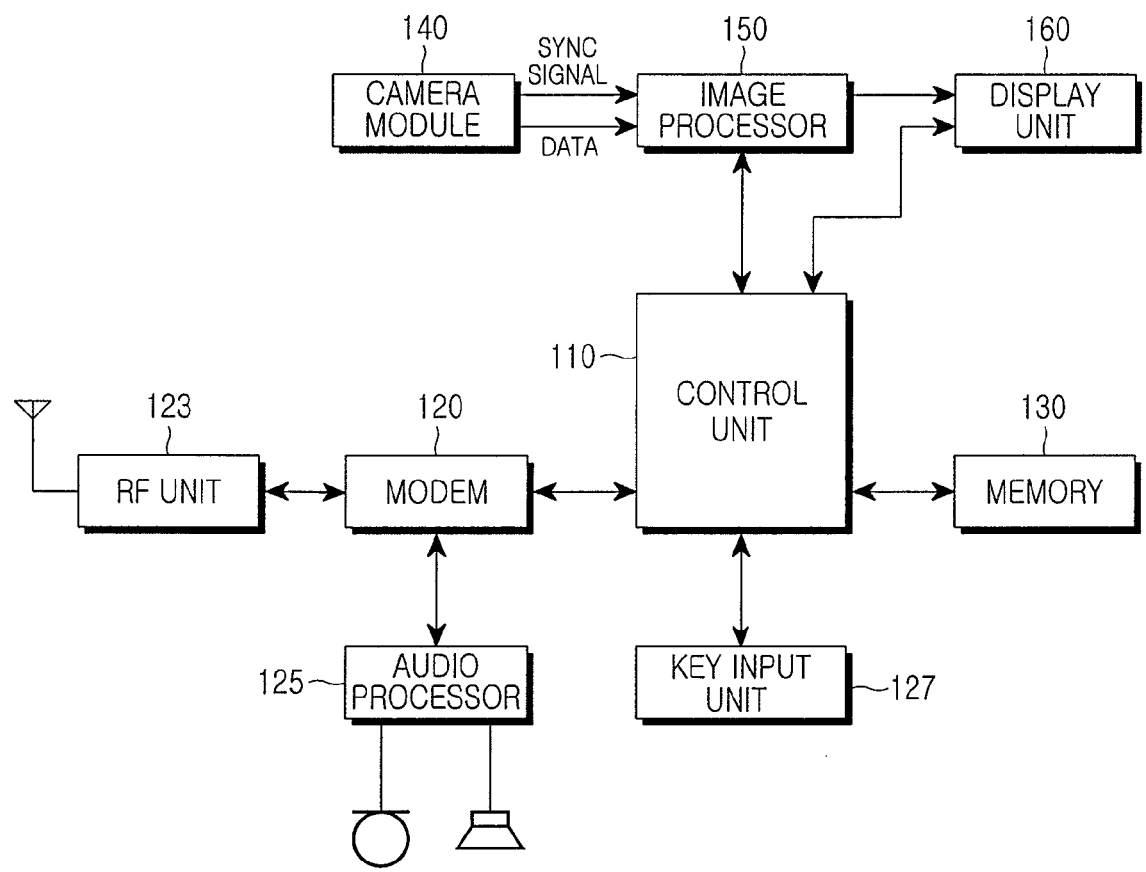
FIG. 1 is a block diagram of a mobile terminal according to an exemplary embodiment of the present invention.

FIG. 1 is a block diagram of a mobile terminal having a single camera module according to an exemplary embodiment of the present invention.
}

Referring to FIG. 1, an RF unit 123 performs a wireless communication function in the mobile terminal. The RF unit 123 includes an RF transmitter for performing upward conversion and amplification of the frequency of a transmitted signal and an RF receiver for amplifying a received signal with low noise and performing downward conversion of the frequency of the signal. A modem 120 includes a transmitter for coding and modulating a signal which will be transmitted and a receiver for demodulating and decoding a received signal. An audio processor 125 may include a codec consisting of a data codec for processing packet data and an audio codec for processing an audio signal such as a speech signal. The audio processor 125 converts a digital audio signal received by the modem 120 into an analog signal and reproduces the analog signal through the audio codec. Also, the audio processor 125 converts an analog audio signal generated from a microphone into a digital audio signal through the audio codec and transfers the digital audio signal to the modem 120. The codec can be provided as an independent component or included in a control unit 110.

A memory 130 may include a program memory and a data memory. The program memory stores programs for controlling the general operations of the mobile terminal. In accordance with an exemplary embodiment of the present invention, the program memory also stores programs for controlling the operation of a camera module 140 according to camera register values for a mode. The data memory temporarily stores data generated during implementation of the above programs.

The memory 130 stores tables provided for the respective modes of the camera module 140. Each table stores camera register values for the corresponding mode. The tables stored in the memory 130 include a camera mode table storing camera register values for a photograph or motion picture mode and a video conference mode table storing camera register values for a video conference mode. Camera register values are set to control the operation of the camera module according to the corresponding mode. In an exemplary embodiment, the camera register values include a pixel clock frequency and a picture size.

In addition, the memory 130 stores a camera mode register variable to determine what mode of operation of the camera has been selected. It also stores initial values of the sensor for the respective modes to initialize the sensor of the camera module 140.

The control unit 110 controls the overall operation of the mobile terminal. The control unit 110 may include the modem 120 and the codec. According to an exemplary embodiment of the present invention, the control unit 110 determines a mode of operating the camera module 140 based on a register variable previously set for the mode, which is stored in the memory 130. Upon determining that a mode has been selected, the control unit 110 turns off and then on the sensor of the camera module 140 and initializes the sensor of the camera module 140 to an initial value previously set and stored for the determined mode.

When the sensor has been initialized, the control unit 110 then extracts camera register values for the mode from a corresponding mode table in the memory 130. In other words, the control unit 110 extracts a pixel clock frequency and a picture size for the mode. The control unit 110 operates the camera module 140 according to the extracted camera register values to implement the corresponding mode.

When the general camera mode is selected, the control unit 110 reads a register variable set for the camera mode from the memory 130 and determines the camera mode.

Upon determining the camera mode, the control unit 110 turns off and then on the sensor of the camera module 140. The control unit 110 reads an initial value for the camera mode from the memory 130 and initializes the sensor of the camera module 140 to the initial value.

When the sensor has been initialized, the control unit 110 then extracts a pixel clock frequency and a picture size for the camera mode from the camera mode table stored in the memory 130. The control unit 110 operates the camera module 140 according to the extracted pixel clock frequency and picture size information to implement the camera mode.

Alternatively, the control unit 110 operates the camera module 140 according to a default pixel clock frequency and a default picture size to implement the camera mode.

When the video conference mode is selected, the control unit 110 reads a register variable set for the video conference mode from the memory 130 and determines the video conference mode. Upon determining the video conference mode, the control unit 110 turns off and then on the sensor of the camera module 140. The control unit 110 reads an initial value for the video conference mode from the memory 130, and initializes the sensor of the camera module 140 to the initial value.

When the sensor has been initialized, the control unit 110 then extracts a pixel clock frequency and a picture size for the video conference mode from the video conference mode table stored in the memory 130. The control unit 110 operates the camera module 140 according to the extracted pixel clock frequency and picture size information to implement the video conference mode.

The camera module 140 is used to photograph an object. The camera module 140 includes a camera sensor for converting a photographed optical signal into an electric signal and a signal processor for converting an analog image signal photographed by the camera sensor into digital data. If the camera sensor is a charge coupled device (CCD) sensor, the signal processor can be a digital signal processor (DSP). The camera sensor and the signal processor can be either integrated into a single element or separated as independent components.

The camera module 140 obtains images according to the camera register values (i.e., pixel clock frequency and picture size) which are inputted according to an operating mode.

An image processor 150 generates picture data for displaying an image signal outputted from the camera module 140. The image processor 150 processes image signals obtained by the camera module 140 in frames. Also, the image processor 150 adjusts the frame image data to conform to the features, such as size and resolution, which are displayable on a display unit 160, and outputs the adjusted frame image data. The image processor 150 includes an image codec and compresses the frame image data displayed on the display unit 160 in a preset manner or restores the compressed frame image data to the original frame image data. The image codec is selected from a variety of still or moving picture codecs, such as a JPEG codec, an MPEG-4 codec or a Wavelet codec. If the image processor 150 has an on screen display (OSD) function, it can output OSD data according to the displayed picture size under the control of the control unit 110.

The display unit 160 displays image data outputted from the image processor 150 or user data outputted from the control unit 110. The display unit 160 can be a liquid crystal display (LCD) including an LCD controller, a memory for storing image data and an LCD device. When the LCD is a touch screen, it can serve as an input unit. The display unit 160 displays an image taken in the camera mode. Also, the display unit 160 displays a user's image taken by the camera module 140 and another participant's image received while in the video conference mode.

A key input unit 127 is provided with alphanumeric keys for inputting numbers and characters and function keys for setting up various functions. According to an exemplary embodiment of the present invention, the key input unit 127 can be further provided with a key for changing the mode of operating the camera module 140 (for example, the camera mode or the video conference mode).

As explained above, the mobile terminal stores tables provided according to the respective modes of the camera module. To provide the tables, a pixel clock frequency appropriate to each mode is calculated, and a resolution required for each mode is determined to set the input/output type and size of the sensor of the camera module. The tables are stored in different addresses of the memory. When the camera module operates, a corresponding table can be read according to a register value inputted to determine the mode of operation of the camera.

A method of controlling a camera module in a mobile terminal according to an exemplary embodiment of the present invention will now be explained in detail with reference to FIG. 2.

Figure 2:
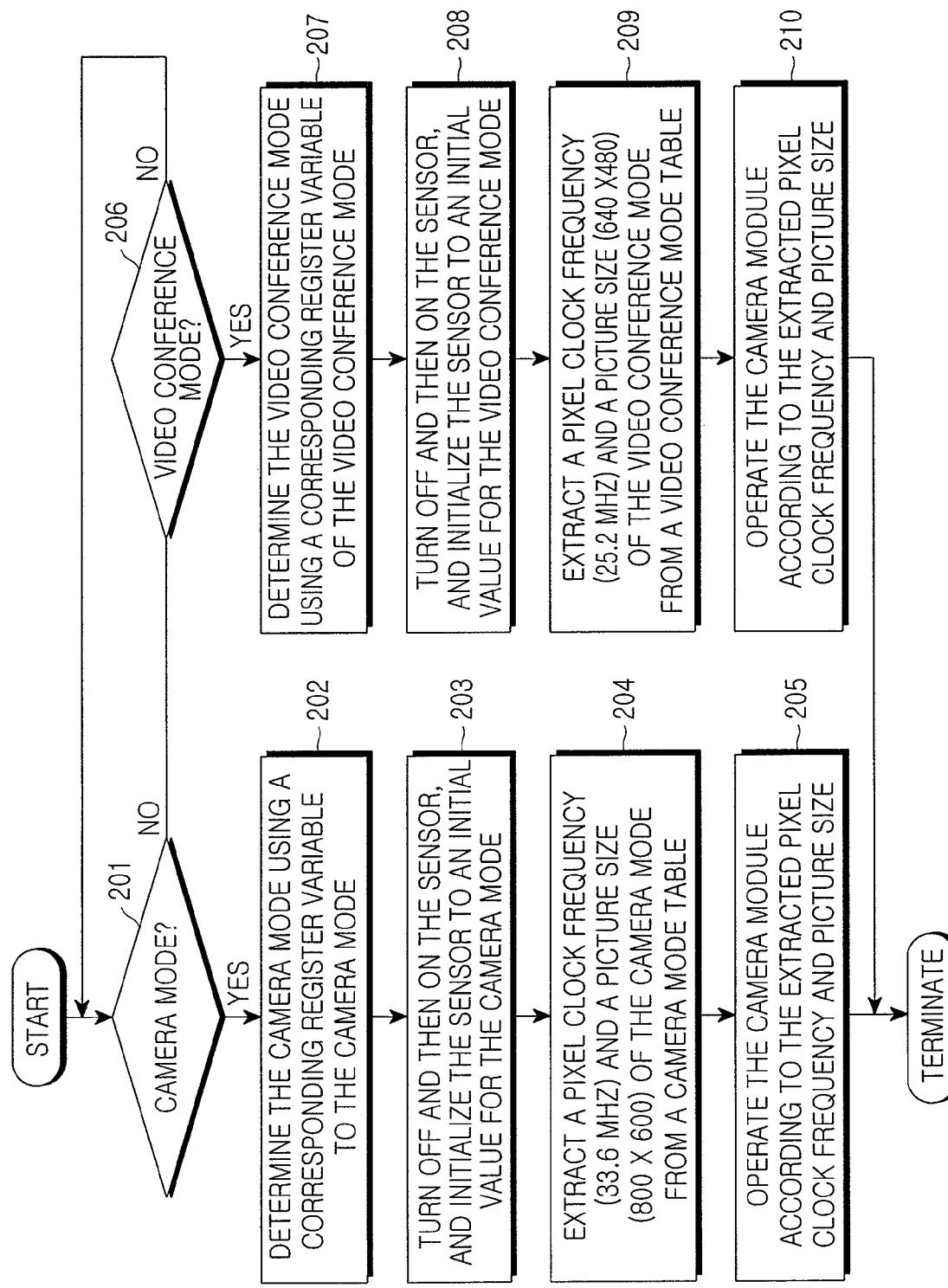
FIG. 2 is a flowchart showing a method of controlling a camera module in a mobile terminal according to an exemplary embodiment of the present invention.

FIG. 2 is a flowchart illustrating the method of controlling the camera module to implement a specific mode according to an exemplary embodiment of the present invention. For purposes of explanation, it is assumed that the camera module operates at a pixel clock frequency of 33.6 MHz and provides a picture size of 800×600 in the camera mode including a photograph mode and a motion picture mode. It is also assumed that the camera module operates at a pixel clock frequency of 25.2 MHz and provides a picture size of 640×480 in the video conference mode. These particular values are merely exemplary, and the present invention is not limited to these particular values.

Referring to FIG. 2, the control unit 110 detects the selection of the camera mode in step 201. The control unit 110 reads a register variable stored in the memory 130 and determines that the camera mode is selected in step 202.

Upon determining the selection of the camera mode, the control unit 110 turns off and then on the sensor of the camera module 140, and initializes the sensor to an initial value previously stored for the camera mode in step 203.

When the sensor of the camera module 140 is initialized to the initial value for the camera mode, the control unit 110 proceeds to step 204 in order to extract a pixel clock frequency of 33.6 MHz and a picture size of 800×600 from a camera mode table stored in the memory 130.

Alternatively, upon initialization of the sensor, the control unit 110 may extract a default pixel clock frequency of 33.6 MHz and a default picture size of 800×600 from the memory 130.

The control unit 110 operates the camera module 140 according to the pixel clock frequency of 33.6 MHz and picture size of 800×600 extracted in step 204 to implement the camera mode in step 205.

When the control unit 110 detects that the video conference mode is selected in step 206, it proceeds to step 207 in order to read a preset register variable stored in the memory 130 and thereby determine the selection of the video conference mode.

Upon determining the selection of the video conference mode, the control unit 110 turns off and then on the sensor of the camera module 140, and initializes the sensor to an initial value previously stored for the video conference mode in step 208.

When the sensor of the camera module 140 is initialized to the initial value for the video conference mode, the control unit 110 proceeds to step 209 in order to extract a pixel clock frequency of 25.2 MHz and a picture size of 640×480 from a video conference mode table stored in the memory 130.

The control unit 110 operates the camera module 140 according to the pixel clock frequency of 25.2 MHz and picture size of 640×480 extracted in step 204 to implement the video conference mode in step 210.

Table 1 shows actual test results of estimating the effect of the present invention. The test results reveal that the current consumption is reduced by about 10 to 14 mA according to the present invention, thereby reducing the power consumption of the mobile terminal.

TABLE 1

| UE Target Power | Transmit/ Receive mode | Binary | #1 | #2 | #3 | #4 | #5 | Avg mA |
|---|---|---|---|---|---|---|---|---|
| 0 dB | Receive | FG3 Binary | 455 | 483 | 459 | 475 | 456 | 465.6 |
|  |  | Improved Binary | 444 | 473 | 447 | 468 | 445 | 455.4 |
|  |  |  |  |  |  | Improvement |  | 10.2 mA |
| 0 dB | Transmit | FG3 Binary | 454 | 454 | 459 | 457 | 456 | 456 |
|  |  | Improved Binary | 443 | 446 | 444 | 443 | 443 | 443.8 |
|  |  |  |  |  |  | Improvement |  | 12.2 mA |
| 13 dB | Receive | FG3 Binary | 563 | 583 | 561 | 592 | 560 | 571.8 |
|  |  | Improved Binary | 545 | 564 | 551 | 579 | 551 | 558 |
|  |  |  |  |  |  | Improvement |  | 13.8 mA |
| 13 dB | Transmit | FG3 Binary | 562 | 561 | 559 | 563 | 558 | 560.6 |
|  |  | Improved Binary | 545 | 550 | 550 | 552 | 548 | 549 |
|  |  |  |  |  |  | Improvement |  | 10.2 mA |

As explained above, the exemplary embodiments of the present invention provide a mobile terminal having a single camera module, which controls the operation of the camera according to the selected mode and thereby reduces the power consumption of the mobile terminal. Since an initial value for initializing a sensor of the camera module is previously set for each mode, it is possible to achieve easy tuning of the sensor for video conferencing and increase the speed of the camera mode and the video conference mode.

Although certain exemplary embodiments of the present invention have been described for illustrative purposes, those skilled in the art will appreciate that various modifications, additions and substitutions are possible, without departing from the scope and spirit of the invention as defined by the accompanying claims, including the full scope of equivalents thereof.

What is claimed is:

1. A camera control device for a mobile terminal, the camera control device comprising:
a camera module having a sensor for photographing an image;
a memory for storing tables of camera register values for respective modes of the camera module; and
a control unit for detecting a selection of a video conference mode, turning off and then on the sensor of the camera module after the selection of the video conference mode is detected, initializing the sensor of the camera module using an initial value based on the video conference mode, extracting camera register values for the video conference mode from a corresponding table stored in the memory, and operating the camera module according to the extracted camera register values to implement the video conference mode.

2. The camera control device according to claim 1, wherein the memory stores initial values of the sensor for the respective modes to initialize the sensor of the camera module.

3. The camera control device according to claim 1, wherein said control unit, upon detecting the selection of a camera mode, extracts a pixel clock frequency and a picture size from a camera mode table stored in the memory and operates the camera module according to the extracted pixel clock frequency and picture size to implement the camera mode, and, upon detecting the selection of a video conference mode, extracts a pixel clock frequency and a picture size from a video conference mode table stored in the memory and operates the camera module according to the extracted pixel clock frequency and picture size to implement the video conference mode.

4. The camera control device according to claim 1, wherein said control unit, upon detecting the selection of a camera mode, operates the camera module according to a default pixel clock frequency and a default picture size to implement the camera mode, and upon detecting the selection of a video conference mode, operates the camera module to extract a pixel clock frequency and a picture size from a video conference mode table stored in the memory and operates the camera module according to the extracted pixel clock frequency and picture size to implement the video conference mode.

5. The camera control device according to claim 2, wherein said control unit, upon detecting the selection of a camera mode, reads a register variable for the camera mode from the memory to determine the camera mode, turns off and then on the sensor of the camera module, and reads an initial value of the sensor for the camera mode from the memory to initialize the sensor of the camera module.

6. The camera control device according to claim 2, wherein said control unit, upon detecting the selection of a video conference mode, reads a register variable for the video conference mode from the memory to determine the video conference mode, turns off and then on the sensor of the camera module, and reads an initial value of the sensor for the video conference mode from the memory to initialize the sensor of the camera module.

7. The camera control device according to claim 4, wherein said camera mode includes a photograph mode and a motion picture mode.

8. A method for controlling a camera module in a mobile terminal, the method comprising:

detecting a selection of a video conference mode;
after the video conference mode is detected, turning off and then on the sensor of the camera module;
initializing the sensor of the camera module using an initial value based on the video conference mode;
extracting camera register values for implementing the video conference mode from a corresponding table stored in a memory; and
operating the camera module according to the extracted camera register values to implement the video conference mode.

9. The method according to claim 8, wherein the detecting of the video conference mode is performed based on a register variable for the video conference mode.

10. The method according to claim 8, wherein said camera register values include a pixel clock frequency and a picture size.

11. The method according to claim 8, wherein said camera mode includes a photograph mode and a motion picture mode.

12. A method for controlling a camera module in a mobile terminal, the method comprising:
when a camera mode is selected, operating the camera module according to a pixel clock frequency and a picture size for the camera mode, which are extracted from a camera mode table, to implement the camera mode; and
when a video conference mode is selected, turning off and then on the sensor of the camera module, initializing the sensor of the camera module using an initial value based on the video conference mode, operating the camera module according to a pixel clock frequency and a picture size for the video conference mode, which are extracted from a video conference mode table, to implement the video conference mode.

13. The method according to claim 12, further comprising when a camera mode is selected, reading a register variable for the camera mode to determine the camera mode.

14. The method according to claim 12, further comprising when a video conference mode is selected, reading a register variable for the video conference mode to determine the video conference mode.

15. The method according to claim 12, wherein said camera mode table includes a pixel clock frequency and a picture size for operating the camera module in the camera mode, and said video conference mode table includes a pixel clock frequency and a picture size for operating the camera module in the video conference mode.

16. The method according to claim 12, wherein said camera mode includes a photograph mode and a motion picture mode.

17. A method for controlling a camera module in a mobile terminal, the method comprising:
when a camera mode is selected, operating the camera module according to a default pixel clock frequency and a default picture size to implement the camera mode; and
when a video conference mode is selected, turning off and then on a sensor of the camera module, initializing the sensor of the camera module using an initial value based on the video conference mode, and operating the camera module according to a pixel clock frequency and a picture size for the video conference mode, which are extracted from a video conference mode table, to implement the video conference mode.

18. The method according to claim 17, further comprising when the camera mode is selected, reading a register variable for the camera mode to determine the camera mode.

19. The method according to claim 17, further comprising when the video conference mode is selected, reading a register variable for the video conference mode to determine the video conference mode.

20. The method according to claim 17, wherein said camera mode table includes a pixel clock frequency and a picture size for operating the camera module in the camera mode; and said video conference mode table includes a pixel clock frequency and a picture size for operating the camera module in the video conference mode.

21. The method according to claim 17, wherein said camera mode includes a photograph mode and a motion picture mode.

\* \* \* \* \*